_United States Patent Office_

3,667,934
Patented June 6, 1972

3,667,934
REFINING OF ZINC
Leslie Jack Derham, deceased, late of Avonmouth, England, by Michael Gordon Derham, legal representative, and Glen Owen John, Bristol, England; said John assignor to Imperial Smelting Corporation (Alloys) Limited, London, England
No Drawing. Filed Oct. 15, 1969, Ser. No. 867,120
Claims priority, application Great Britain, Oct. 23, 1968, 50,378/68, 50,379/68, 50,380/68
Int. Cl. C22b 19/32, 9/10
U.S. Cl. 75—86                                    8 Claims

ABSTRACT OF THE DISCLOSURE

Zinc which contains aluminium as an impurity is purified by treating the molten metal with chlorine, in free or combined form, under a molten flux formed from sodium chloride and aluminium chloride.

---

This invention relates to the refining of zinc by removal of aluminium from metallic materials containing zinc and aluminium.

More particularly it relates to the removal of aluminium from scrap material containing zinc and zinc alloys, from primary zinc produced from a zinc blast furnace and from undistilled zinc residues recovered from a refluxer used for zinc purification. Such materials which are contaminated with aluminium may arise in various ways, such as those set out below.

There is considerable interest in the recovery of a variety of non-ferrous metals which are present in bulks of scrap metal: for example, in the destruction of scrap automobiles. The non-ferrous fraction obtained from such sources, for example the "Proler" process (registered trademark) for disintegrating cars and the like, contains a variety of metals, amongst them zinc, aluminium, and copper. A further source of zinciferous scrap is from diecasting processes, using a range of zinc-aluminium alloys. Indeed it is such alloys that give rise to a major part of the zinc in Proler scrap. Zinciferous scrap can be obtained in other ways: for example that known as "sweater metal."

A number of processes are known whereby the zinc may be recovered from this type of material; nearly all of them depend on a sequential type of operation, in which each of the elements is recovered in a more or less usable form one at a time. Generally speaking, aluminium is recovered by some form of chlorination process, and zinc next removed by a distillative process, leaving a cupriferous residue. There are a number of known processes for removal of aluminium by chlorination: in some, sufficient chlorine is used to volatilise the aluminium as aluminium trichloride, and it is collected as such. In others, it is volatilised, at a much higher temperature as aluminium monochloride: on cooling this compound is unstable and a substantial part of the aluminium is recovered as metal. In yet a third, the source of chlorine used is ferric chloride; some of the aluminium is then recovered as aluminium chloride, and some as an iron-aluminium intermetallic compound which precipitates from the melt.

All of these processes are, to some degree, useful if the zinc contains appreciable amounts of aluminium, and its recovery in one form or another is economically justifiable. For example, by direct chlorination with chlorine gas, aluminium chloride of good purity and G.O.B. grade zinc can be obtained from Mazak scrap. ("Mazak" is a registered trademark). But the usefulness of zinc, even of basic G.O.B. purity which contains aluminium, is limited; for example, the electrothermic furnace process for making zinc dust commonly uses scrap zinc as its metal feed stock; any aluminium present forms carbide with the carbon present and tends to short out the electrodes. Further at this level it is not economical to recover the aluminium present due to the very small amounts involved.

In the production of zinc in a blast furnace, the gases produced are conducted to a condenser where they are brought into contact with a circulating stream of molten lead, to dissolve the zinc vapour contained in the gases. Typically, the lead enters the condenser at a temperature of about 450° C., containing about 2.0% by weight of zinc, and leaves at about 565° C., containing about 2.25% by weight of zinc. This lead is then cooled to about 450° C. by passing it through water cooled launders, or other suitable devices, whereby the excess of zinc separates out as a liquid metal layer on the lead, leaving 2.0% of zinc in the lead.

However, zinc concentrates often contain arsenic, some of which is volatilised, and dissolved by the lead ciriculating in the condenser-launder system. This arsenic dissolves in the molten lead-zinc mixture, and when it separates into two liquid metal layers both distributes itself between the layers and precipitates as zinc arsenide, which forms an adherent coating on the walls of the launders and other passages through which the mixture of molten metals is caused to flow. The presence of this arsenic is disadvantageous, partly because of this formation of solid arsenides, partly because it must be removed from the metal to render it saleable, and partly because its presence promotes the oxidation of the molten zinc, thus leading to the formation of excessive amounts of oxidic drosses. It has been shown that the addition of aluminium metal to the zincy lead circulating in such a system is extremely beneficial, in that it removes arsenic, and also considerably reduces the excessive dross formation induced by the arsenic.

However, use of aluminium to remove arsenic, and any form that may be present, raises the problem that for certain purposes the residual aluminium is undesirable. It, too, then has to be removed.

In the production of zinc by the various pyrometallurgical processes that are currently being operated, the virgin zinc contains a variety of impurities. Some of these, for example lead and iron, are deleterious and restrict the saleability of the metals whilst cadmium is of value in itself, and therefore recovered. One process whereby such virgin zinc is refined both to remove contaminants such as lead and to recover the cadmium is by distillation, in apparatus known as refluxers.

However, there are a number of problems attendant upon the use of refluxers, some of which this invention seeks to overcome. Due to the nature of the ores used for pyrometallurgical production of zinc, the virgin metal frequently contains arsenic. This can be removed in a variety of ways, but one that is commonly used is to add metallic aluminium. Thus the metal passing to the refluxers can contain aluminium.

The presence of aluminium in feed metal to a refluxer is not, of itself, a disadvantage, since it reduces the excessively corrosive effects of molten zinc, and tends to reduce the amount of oxidic dross that is formed. Its presence however, is generally avoided, because it must all report in the zinc residues tapped, undistilled, from the bottom of the refluxer columns. Even though the original level is quite low, due to its accumulation in this material, it renders the zinc tapped from the bottom of the refluxers of low commercial value, as it cannot even be sold as G.O.B. grade zinc. Since only 50–60% of the zinc fed to the refluxers is in fact distilled, rendering about 40–50% of the feed zinc unsaleable presents an overwhelming economic disadvantage.

In the case of each of the metallic materials described above it has been proposed to remove aluminium from the zinc-containing material by means of a chlorination treatment of the molten metal to produce aluminium chloride vapour, which is driven off. However, such a chlorination treatment involves various problems, including the following:

(1) Aluminium chloride vapour cannot be allowed to escape into the atmosphere since it would lead to an intolerable atmosphere pollution problem.

(2) It is highly desirable to cover the surface of the molten metal with a layer of flux to prevent oxidation of the surface of the metal exposed to the atmosphere and excessive dross formation during the chlorination process.

The commonest flux used in zinc metallurgy is zinc ammonium chloride. However, this has a number of disadvantages, particularly that it "stiffens" as its zinc oxide content increases. For chlorination processes a fully fluid flux is desirable. Secondly, using this flux, due to the temperature of the molten metal, aluminium chloride evaporates from the flux layer. Unless the vapour is trapped in some way its hydrolyses in contact with moisture in the atmosphere to form a fume of finely-divided alumina dust and hydrochloric acid, thus not avoiding the air pollution problem.

We have now discovered that these problems can be largely overcome by employing as a flux, during chlorination, a combination of sodium chloride and aluminium chloride.

This invention consists in a process for the removal of at least part of the aluminium from aluminium-contaminated metallic zinc materials, comprising treating a molten metal phase containing zinc and aluminium with chloride, in free or combined form, under a molten flux formed from sodium chloride and aluminium chloride.

The molten metal phase can usually be produced by subjecting the zinc material to heat treatment until melting occurs, in a suitable receptacle.

The process of the invention depends upon the surprising discovery that the vapour pressure of aluminium chloride over a flux containing a little more NaCl than the $NaCl/AlCl_3$ eutectic is so low that very little vapour escapes and that substantially no fume is formed as a result.

The chlorine may be added to the metal in various ways. Perhaps the most convenient form is as chlorine gas but chemically-combined chlorine may be added e.g. as zinc chloride or as ammonium chloride.

We have found that if the flux mixture is deliberately caused to be deficient in aluminium chloride, the flux layer will tend to absorb aluminium chloride formed due to reaction of chlorine with aluminium.

Thus the flux preferably contains an excess of sodium chloride over the stoichiometrically required to form the compound $NaAlCl_4$ with the aluminium chloride present. The flux is thus preferably formed from a mixture of $NaAlCl_4$ and excess sodium chloride.

The process of the invention may be operated either batchwise, in a ladle or other suitable receptacle, or as a continuous process. For the batchwise process, since the aluminium content of the metallic charge is at least approximately known, one charge of flux could be used. Alternatively, a smaller initial amount could be used and further sodium chloride added as chlorination proceeds. For the continuous process, it is advantageous to circulate the flux, so that its sodium chloride content can be maintained in excess of the amount required to form $NaAlCl_4$ and so that excess flux may be bled from the system. This excess material is useful as a routine metallurgical flux. It may be removed and used elsewhere as a general purpose flux.

METHOD OF PREPARATION OF THE FLUX

It is of prime importance that both constituents be dry: in the case of sodium chloride this is achieved quite simply by powdering and heating in an oven; in the case of aluminium chloride it may involve distillation in a suitable apparatus if it has deteriorated upon storage.

The two dry salts are mixed in a ratio of 3 parts by weight of sodium chloride, and 7 parts by weight of aluminium chloride and added to a heated steel pot maintained at an internal temperature of 300° C. As soon as a liquid pool has formed, to this are added the salts, premixed in the same ratio, at such a rate as to maintain a liquid pool. This ratio corresponds to the double salt $NaAlCl_4$; when sufficient material is in the pot, excess sodium chloride can be added in order to obtain a mixture that is rich in sodium chloride. Care needs to be taken, however, as addition of excess sodium chloride causes the melting point to rise quite sharply, from the value at the eutectic, which corresponds to the double salt $NaAlCl_4$, of about 185° C. We prefer that the excess is not made so high that the mix will not be adequately fluid as an overlayer on molten zinc at a temperature of 400–450° C.

We prefer that the flux be made and used as needed; it can, however, be cast, in suitable moulds, and used later as required. It keeps moderately well, but preferably should be kept in sealed containers so that ingress of moisture is prevented.

The invention will be further described by reference to the following examples which are not intended to limit the scope of the invention, as defined in the appended claims.

EXAMPLE 1

4,500 lbs. of zinc containing 0.03% aluminium were melted in a furnace and the temperature of the molten metal was raised to 450° C. A layer of sodium aluminium chloride flux approximately 2 inches deep was established on the surface of the molten metal. 8 lbs. of zinc chloride and 8 lbs. of sodium chloride were added and the metal was stirred manually for 30 minutes. A further 8 lbs. of zinc chloride were then added and the metal stirred for a further 2 hours.

|   | Percent |
|---|---|
| Al in input metal | 0.03 |
| Al in metal after 30 minutes stirring | 0.02 |
| Al in metal after further 2 hours stirring | 0.01 |

EXAMPLE 2

4,500 lbs. of zinc containing 0.08% aluminium were melted in a furnace, and the temperature of the molten metal was raised to 450° C. A layer of molten sodium aluminium chloride flux approximattely 2 inches deep was established on the surface of the molten metal. 24 lbs. of zinc chloride and 24 lbs. of sodium chloride were then added and the metal was stirred manually for 30 minutes. A mechanical stirrer was then installed. Samples of metal were taken after 2 hours, 3 hours and 18 hours of stirring with this stirrer. A further addition of 4 lbs. of zinc chloride was made after the 2 hour sample was taken.

RESULTS

|   | Percent |
|---|---|
| Al in input metal | 0.08 |
| After 30 minutes manual stirring | 0.05 |
| After 2 hours mechanical stirring | 0.03 |
| After 3 hours mechanical stirring | 0.02 |
| After 18 hours mechanical stirring | <0.01 |

It is believed that the treatment time could be much reduced with more efficient mechanical stirring.

We claim:
1. A process for the removal of at least part of the aluminium from a molten aluminium-contaminated metallic zinc material, which comprises:
  (a) heating sodium chloride and aluminium chloride to form the double salt sodium aluminum chloride;
  (b) covering the molten aluminium-contaminated metallic zinc material with said double salt as a molten flux layer;
  (c) including as a constituent in said molten flux layer an additional amount of sodium chloride in excess of the stoichiometric amount required to form a double salt with the total amount of aluminium chloride present in said molten flux layer;
  (d) treating the molten aluminium-contaminated metallic zinc material with chlorine, in free or combined form, to remove aluminium in said material; and
  (e) maintaining a sufficient depth of said flux layer to provide a cover over said material during chlorine treatment with said flux layer containing said additional amount of sodium chloride in amounts sufficient to provide an excess of the stoichiometric amount required to form a double salt with the aluminium chloride present and yield a flux layer that is fluid during said treatment so that the aluminium chloride formed during said treatment is absorbed by said flux layer thereby reducing the emission of fume caused by said treatment.

2. The process as set forth in claim 1, wherein the chlorine is added to the molten aluminium-contaminated metallic zinc material as chlorine gas.

3. The process as set forth in claim 1, wherein the chlorine is added to the molten aluminium-contaminated metallic zinc material as zinc chloride.

4. The process as set forth in claim 1, wherein the process is operated batchwise.

5. The process as set forth in claim 1, wherein the process is operated as a continuous process.

6. The process as set forth in claim 1, wherein the aluminium-contaminated metallic zinc material is a scrap material containing zinc alloys.

7. The process as set forth in claim 1, wherein the aluminium-contaminated metallic zinc material is primary zinc produced from a zinc blast furnace.

8. The process as set forth in claim 1, wherein the aluminium-contaminated metallic zinc material is the undistilled residue recovered from a refluxer unit for the purification of zinc.

References Cited

UNITED STATES PATENTS

| | | | |
|---|---|---|---|
| 1,321,281 | 11/1919 | Burgess | 23—93 |
| 1,455,005 | 5/1923 | Kirkpatrick et al. | 23—93 |
| 1,541,068 | 6/1925 | Pelzer et al. | 23—93 |
| 1,818,839 | 8/1931 | Brindley | 23—93 |
| 2,119,197 | 5/1938 | Betterton et al. | 75—63 |
| 2,452,665 | 11/1948 | Kroll et al. | 75—63 |
| 2,701,194 | 2/1955 | Deterding | 75—86 X |
| 3,145,097 | 8/1964 | Derham | 75—63 |
| 3,152,864 | 10/1964 | Derham | 23—93 |
| 3,273,995 | 9/1966 | Ruppert et al. | 75—86 X |
| 3,406,009 | 10/1968 | Gould et al. | 23—93 |
| 3,512,959 | 5/1970 | Joseph et al. | 75—94 X |

HENRY W. TARRING II, Primary Examiner

U.S. Cl. X.R.

75—63, 94; 23—93